(12) United States Patent
Khoe

(10) Patent No.: US 8,267,614 B2
(45) Date of Patent: Sep. 18, 2012

(54) EASY INSTALL GUIDE SLOT WITH SNAP TAB

(75) Inventor: Stephen Bie Khoe, Dearborn Heights, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 297 days.

(21) Appl. No.: 12/429,286

(22) Filed: Apr. 24, 2009

(65) Prior Publication Data

US 2010/0272507 A1    Oct. 28, 2010

(51) Int. Cl.
*B25G 3/18*    (2006.01)

(52) U.S. Cl. ......... 403/326; 403/329; 403/361; 296/70; 296/72; 180/90

(58) Field of Classification Search .................. 403/326, 403/329, 361; 24/297, 614
See application file for complete search history.

(56) References Cited

U.S. PATENT DOCUMENTS

| | | | |
|---|---|---|---|
| 4,679,282 A * | 7/1987 | Feng ................................ | 24/614 |
| 4,905,442 A | 3/1990 | Daniels | |
| 5,104,253 A * | 4/1992 | Zielinski et al. .............. | 403/329 |
| 5,484,223 A * | 1/1996 | Saito ................................ | 403/329 |
| 5,542,161 A * | 8/1996 | Anscher ......................... | 24/614 |
| 5,631,419 A | 5/1997 | Fruitman et al. | |
| 5,791,026 A * | 8/1998 | Anscher ......................... | 24/615 |
| 6,000,109 A * | 12/1999 | Anscher ......................... | 24/614 |
| 6,148,486 A * | 11/2000 | Uehara et al. .................. | 24/170 |
| 6,163,942 A * | 12/2000 | Liao ................................ | 24/625 |
| 6,351,876 B1 * | 3/2002 | Uehara ........................... | 24/625 |
| 6,421,889 B1 * | 7/2002 | Chien ............................. | 24/614 |
| 6,460,232 B2 * | 10/2002 | Maruoka ........................ | 24/615 |
| 6,571,433 B2 * | 6/2003 | Uehara et al. .................. | 24/614 |
| 6,662,414 B1 * | 12/2003 | Niewiadomski ............... | 24/625 |
| 6,682,254 B1 | 1/2004 | Olofsson et al. | |
| 6,728,999 B2 * | 5/2004 | Murai et al. .................... | 24/615 |
| 6,910,827 B2 * | 6/2005 | Maloof et al. ................. | 403/319 |
| 6,948,769 B2 | 9/2005 | Borkowski et al. | |
| 7,174,609 B2 * | 2/2007 | Park ............................... | 24/614 |
| 7,364,382 B2 | 4/2008 | Benedetti et al. | |
| 7,448,116 B1 * | 11/2008 | Howell .......................... | 24/614 |
| 7,874,049 B2 * | 1/2011 | Paik ............................... | 24/615 |
| 2002/0040514 A1 * | 4/2002 | Uehara et al. .................. | 24/614 |

(Continued)

FOREIGN PATENT DOCUMENTS

WO    WO-98/43855 A1    10/1998

(Continued)

*Primary Examiner* — Daniel P. Stodola
*Assistant Examiner* — Jonathan Masinick
(74) *Attorney, Agent, or Firm* — Gifford, Krass, Sprinkle, Anderson & Citkowski, P.C.

(57) ABSTRACT

A rear loaded part for attaching to a mounting plate having a mating part with a pair of parallel side walls each having a proximate end attached to the mounting plate. An upper surface, which extends between the pair of parallel side wall, includes an aperture and an elongated rib extending parallel to the pair of parallel side walls. The rear loaded part having a pair of parallel guide rails with a proximate end and an opposite distal end. The pair of parallel guide rails extends outwardly from the rear loaded part to define an elongated channel which is dimensioned to receive the elongated rib of the mating part. A pair of tabs extends outwardly from the pair of guide rails, and are dimensioned to snap into the aperture of the upper surface to releasably lock the rear loaded part to the mounting plate.

10 Claims, 3 Drawing Sheets

U.S. PATENT DOCUMENTS

| | | | |
|---|---|---|---|
| 2002/0040515 A1* | 4/2002 | Uehara et al. | 24/614 |
| 2005/0204522 A1* | 9/2005 | Paik | 24/614 |
| 2006/0239772 A1* | 10/2006 | Kuroda | 403/329 |
| 2009/0100652 A1* | 4/2009 | Mok | 24/625 |

FOREIGN PATENT DOCUMENTS

| | | |
|---|---|---|
| WO | WO-2004/093259 A1 | 10/2004 |

* cited by examiner

EASY INSTALL GUIDE SLOT WITH SNAP TAB

FIELD OF THE INVENTION

The present invention relates to the joining of a first part to a second part. More particularly, the invention relates to the corresponding mating parts located on each of the first and second parts.

BACKGROUND OF THE INVENTION

There are many previously known systems which utilize corresponding mating parts with attachment features for releasably attaching a first part to a second part. However, these previously known systems usually lack a guide feature to ensure proper and straight installation of the first part to the second part. Guide features are important when the proper installation of the first part requires it to be installed at a specific angle to the second part.

There are some known systems which include both an attachment feature and an alignment feature on the corresponding mating parts. However, the attachment feature is separate and distinct from the alignment feature, and as the distance between the attachment feature and the guide feature increases so does the probability that a mismatch will occur during assembly.

Thus, there exists a need for a system for releasably attaching a first part to a second part which integrates a guide feature to ensure proper and straight installation with an attachment feature for releasably attaching the first part to the second part.

SUMMARY OF THE INVENTION

The present invention provides a system for releasably attaching a first part to a second part which overcomes the above-mentioned disadvantages of the previously known attachment systems.

In brief, a system for releasably attaching a first part to a second part includes a first mating part disposed on one of either the first part or the second part. The first mating part having an outwardly extending pair of parallel side walls and a planar surface extending between the pair of side walls. The planar surface includes an aperture and an elongated rib extending parallel and between the pair of side walls. A second mating part is disposed on the other of the first part or the second part and includes a pair of parallel guide rails and a tab member. The pair of parallel guide rails extends outwardly so as to define an elongated channel dimensioned to receive the elongated rib of the first mating part. The tab member extends outwardly from the second mating part and is dimensioned to engage the aperture of the first mating part to releasably attach the first part to the second part.

DETAILED DESCRIPTION OF THE INVENTION

The present invention has utility as a system for releasably attaching a first part to a second part which overcomes the above-mentioned disadvantages. By providing a system having corresponding mating parts which integrates a guide feature, to ensure proper and straight installation, and an attachment feature, for releasably attaching the first part to the second part, the probability of a mismatch between the first part and the second part decreases.

Figure 1:
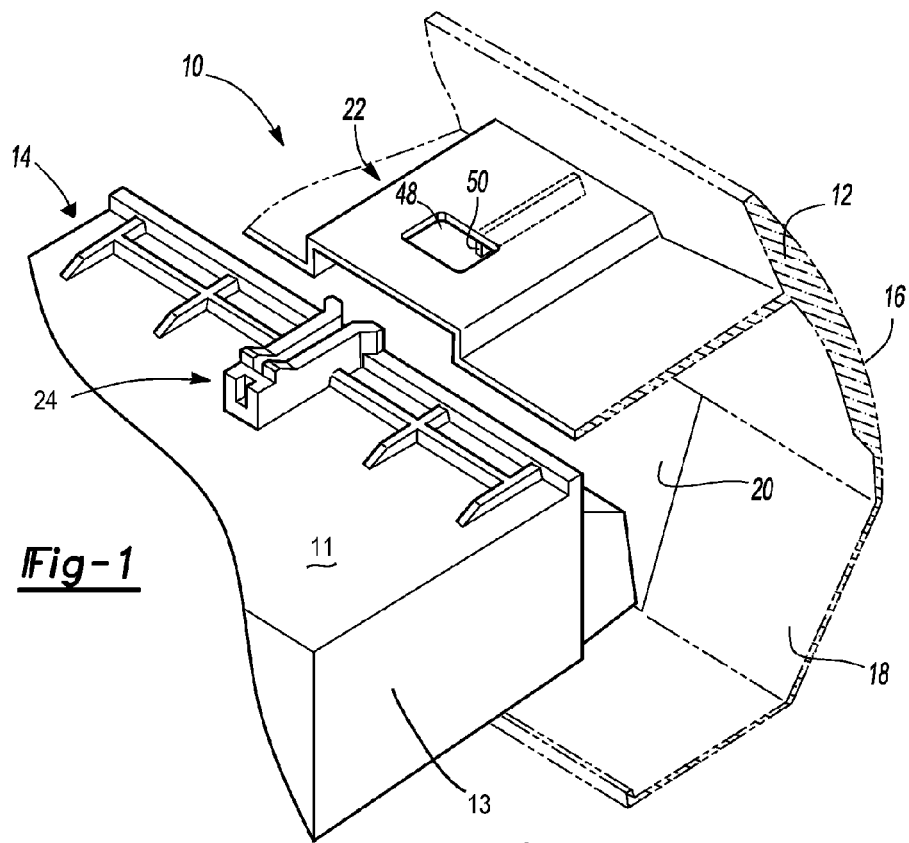
FIG. 1 is a rear perspective view illustrating a first part having a first mating part and a second part having a second mating part.

With reference to FIG. 1 the inventive system for releasably attaching a first part to a second part is generally illustrated at 10. In the illustrated embodiment the first and second parts of the system 10 are a mounting plate 12 and a rear loaded part 14, respectively. The mounting plate or instrument panel 12 is of the type used for the interior of an automobile, and has a front face 16 for facing the interior and a rear face 18 for the attachment of devices such as gauges, radios, or various controls. The rear loaded part 14 includes a housing 11 having a pair of parallel outer side walls 13 and a front portion 15. The front portion 15 is angled with respect to the pair of parallel side walls 13. In the illustrated embodiment the rear loaded part 14 is an input selector having various control buttons for actuation by the occupants of the automobile. An opening 20 extends from the rear face 18 to the front face 16 of the mounting plate 12, allowing for at least a portion of the front portion 15 of the rear loaded part 14 to protrude through the mounting plate 12 so as to allow the occupants of the automobile access to the various controls of the rear loaded part 14.

It will be appreciated that the invention is not limited to use with a rear loaded part and a mounting plate, rather the inventive system may be used to releasably attach any other types of suitable parts.

Figure 2:
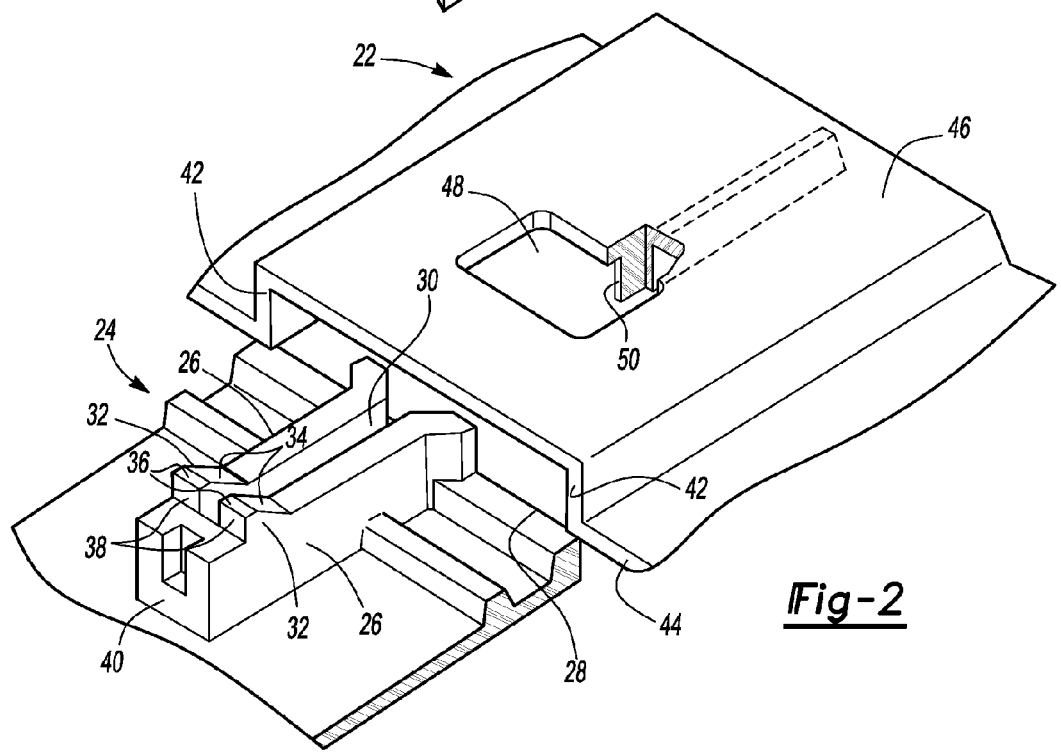
FIG. 2 is an enlarged rear perspective view illustrating the first mating part and the second mating part.

As seen in FIG. 1, and enlarged in FIG. 2, the mounting plate 12 includes a mounting plate mating part 22 and the rear loaded part 14 includes a corresponding rear loaded mating part 24. The mounting plate mating part 22 extends outwardly from the rear face 18 of the mounting plate 12. The mounting plate mating part 22 and the corresponding rear loaded mating part 24 facilitates the proper and secure attachment of the rear loaded part 14 to the mounting plate 12.

The rear loaded mating part 24 includes a pair of guide rails 26 which extends outwardly from a proximate end 28 towards the center of the rear loaded part 14. The pair of parallel guide rails 26 are spaced apart so as to define an elongated channel 30. A portion of the guide rails 26 adjacent the proximate end 28 of the rear loaded part 14 are angled obliquely so as to increase the width of the entrance of the elongated channel 30. The elongated channel 30 and the guide rails are formed so as to be angled with respect to the front portion 15, and parallel to the pair of parallel side walls 13 of the housing 11 of the rear loaded part 14.

A tab 32 extends outwardly from each of the guide rails 26. The front faces 34 of the tabs 32 which face the proximate end 28 of the rear loaded part 14 slopes upwardly from the guide rails 26 to a top portion 36 of the tabs 32. The rear faces 38 of the tabs 32 have a substantially vertical face extending from the guide rails 26 to the top portions 36. An end wall 40 extends between the guide rails 26 to close off the elongated channel 30.

The mounting plate mating part 22 has a pair of parallel side walls 42 extending from an installation end 44 at the exterior of the mounting plate mating part 22 to the rear face 18 of the mounting plate 22. An upper surface 46 extends transversely between the pair of parallel side walls 42. The upper surface 46 includes an aperture 48 and an outwardly extending elongated rib 50 which is parallel to the pair of parallel side walls 42. The elongated rib 50 extends from the rear face 18 of the mounting plate 12 to the aperture 48.

Figure 3:
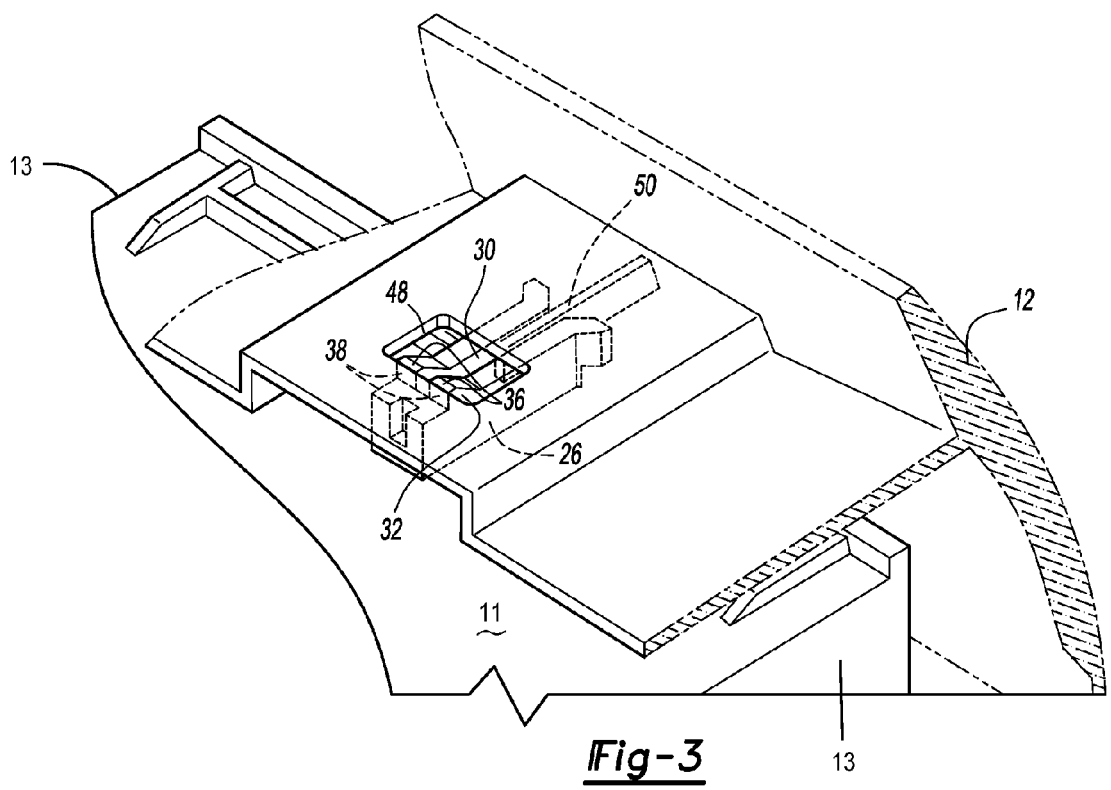
FIG. 3 is a rear perspective view illustrating the first part installed to the second part through the engagement of the first mating part and the second mating part.
Figure 4:
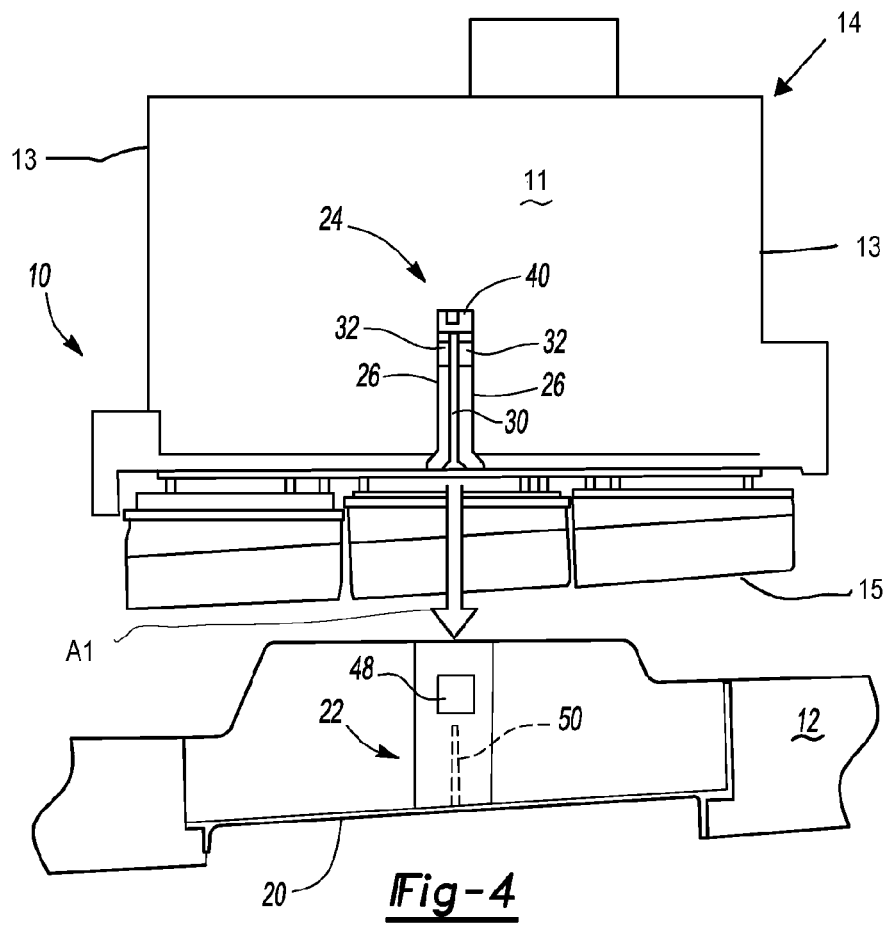
FIG. 4 is a top elevational view illustrating the installation of the first part with the second part.
Figure 5:
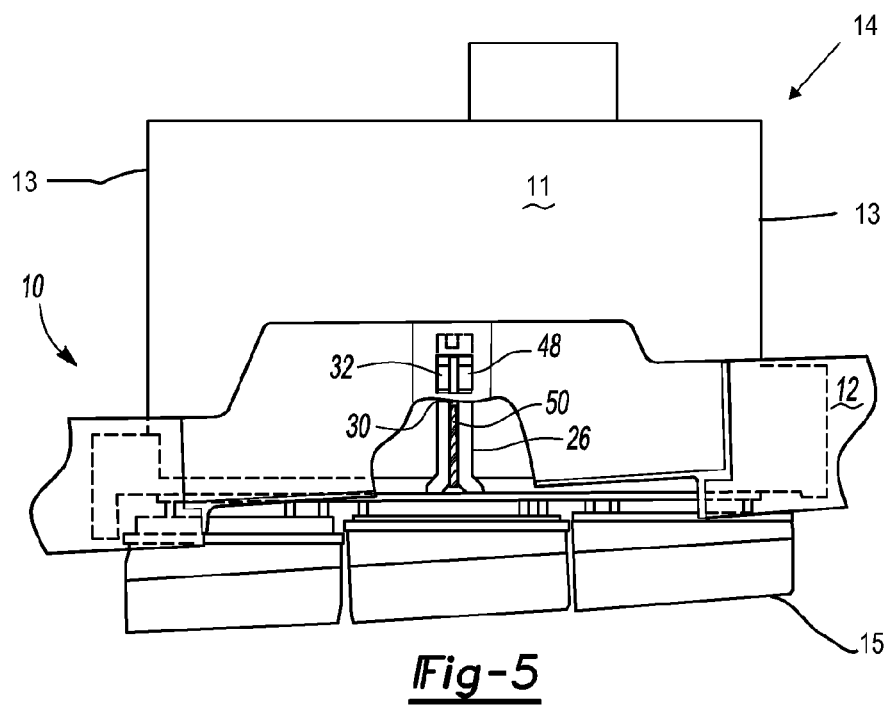
FIG. 5 is a top elevational view illustrating the first part installed to the second part through the engagement of the first mating part and the second mating part.

Referring to FIGS. 3-5 the attachment of the rear loaded part 12 and the mounting plate 12 will now be discussed. During assembly the rear loaded part 12 is brought into engagement with the mounting plate 14 and in order to ensure proper and straight installation the elongated rib 50 and the elongated channel 30 act as a guide feature, and the tabs 32 and the aperture 48 function as an attachment feature. Since the tabs 32 are disposed in close proximity to the elongated channel 30 the probability of a mismatch during installation is decreased due to the lack of distance between the guide feature and the attachment feature.

During installation the elongated rib 50 of the mounting plate mating part 22 first comes into contact with the entrance of the elongated channel 30. The increased width of the portion of the elongated channel 30 adjacent the proximate end 28 allows for quicker and easier installation as the installer is given an increased degree of flexibility in bringing the elongated rib 50 into engagement with the elongated channel 30.

Upon entry of the elongated rib 50 into the elongated channel 30 the engagement facilitates the proper installation angle of the two parts. As seen in FIGS. 4 and 5, the installation of the rear loaded part 14 to the mounting plate 12 often requires a specific angle as the rear loaded part 14 does not install exactly perpendicular to the opening 20 or the mounting plate 12. The elongated channel 30 defines an axis of insertion, arrow A1 in FIG. 4, of the rear loaded part 14 into the mounting plate 12, specifically, the rear loaded mating part 24 into the mounting plate mating part 22. The axis of insertion Al is skewed at an acute angle with respect to the front portion 15. The elongated rib 50 and elongated channel 30 function as a guide feature and allows an installer, who usually installs the rear loaded part 14 while observing the front face 16 of the mounting plate 12, to quickly and properly install the rear loaded part 14 to the mounting plate 12 using the axis on insertion Al to properly orient the rear loaded part 14.

As the rear loaded part is inserted towards the rear face 18 of the mounting part 12, the elongated rib 50 extends into the elongated channel 30 until the tabs 32 contact the installation end 44 of the mounting plate mating part 22. The sloping front faces 34 of the tabs 32 allow the rear loaded mating part 24 to slide under the upper surface 46 of the mounting plate mating part 22 until the tabs 32 snap fit into the aperture 48 so as to releasably attach the rear loaded part 14 to the mounting plate 12.

It will be appreciated that the location of the tabs 32, elongated rib 50, and the aperture 48 are modifiable so long as the location of the tabs 32 and the aperture 48 correspond upon the engagement of the rear loaded mating part 24 and the mounting plate mating part 22. For example, the tabs 32 can optionally be located in the middle of the guide rails 26, and the aperture 48 in a corresponding location with the elongated rib 50 extending on either side of the aperture 48. In an alternative embodiment, the features of the mounting plate mating part 22 and the rear loaded mating part 24 are swapped such that the rear loaded mating part 24 has the features of the mounting plate mating part 22 and the mounting plate mating part 22 have the features of the rear loaded mating part 24.

From the foregoing, it can be seen that the present invention provides a system for releasably locking a rear loaded part to a mounting plate ensuring proper and straight installation while increasing the probability of proper alignment. Having described my invention, however, many modifications thereto will become apparent to those skilled in the art to which it pertains without deviation from the spirit of the invention as defined by the scope of the appended claims.

It is claimed:

1. A connection system for components of a vehicle comprising:
   an instrument panel for the vehicle having a front face and an opposite rear face, a first mating part extending from said rear face of said instrument panel, said first mating part having an outwardly extending pair of parallel spaced apart side walls and a planar surface extending between said pair of side walls, said planar surface having an aperture and an elongated rib extending parallel and between said pair of side walls; and
   a rear loaded part having a pair of outer side walls, a front portion extending between said pair of outer side walls, and a second mating part, said second mating part having a pair of parallel guide rails and a tab member, said pair of guide rails extend outwardly so as to define an elongated channel dimensioned to receive said elongated rib of said first mating part, said pair of parallel guide rails defining an axis of insertion of said rear loaded part, said axis of insertion being centered within said elongated channel and skewed at an acute angle with respect to a forwardmost face of said front portion of said rear loaded part, said tab member extends outwardly from said second mating part, said tab member dimensioned to engage said aperture of said first mating part to releasably attach said rear loaded part to said instrument panel along said axis of insertion;
   wherein upon engagement of said elongated rib within said elongated channel, said pair of parallel guide rails guides said rear loaded part into engagement with said instrument panel along said axis of insertion.

2. The connection system of claim 1, wherein each of said pair of guide rails have a proximate end and a distal end opposite said proximate end, and wherein a portion of each of said pair of guide rails adjacent said proximate end is angled obliquely so as to increase the width of a portion of said elongated channel adjacent said proximate end.

3. The connection system of claim 2, wherein an end wall extends between said distal ends of said pair of guide rails.

4. The connection system of claim 1, wherein said tab member includes a pair of outwardly extending tabs disposed on said pair of guide rails.

5. The connection system of claim 4, wherein said pair of tabs are disposed adjacent said distal end of said pair of guide rails.

6. The connection system of claim 1, wherein said instrument panel includes an opening, and wherein upon engagement of said tab member and said aperture of said first mating part at least a portion of said front portion of said rear loaded part extends through said opening and beyond said front face of said instrument panel, and a portion of a rear portion of said rear loaded part extends beyond said rear face of said instrument panel.

7. A connection system for components of a vehicle comprising:
   an instrument panel for the vehicle, said instrument panel having a forwardmost front face, said instrument panel having an opening extending between said front face and an opposite rear face, said instrument panel having a first mating part extending from said rear face adjacent said opening, said first mating part having a pair of parallel side walls each having a proximate end attached to said instrument panel, a planar surface extending between said side walls, said planar surface having an aperture and an elongated rib extending parallel to said side walls; and a rear loaded part having a pair of outer side walls, a front portion, and a second mating part, said second mating part having a pair of parallel guide rails and a pair of tabs, said pair of guide rails having a proximate end and an opposite distal end, said pair of parallel guide rails defining an elongated channel, said pair of tabs extending outwardly from said pair of guide rails, said pair of tabs dimensioned to snap into said aperture of said planar surface of said first mating part to releasably attach said rear loaded part to said instrument panel along an axis of insertion;

wherein upon engagement of said rear loaded part with said instrument panel a portion of said front portion of said rear loaded part extends through said opening and beyond said front face of said instrument panel and a portion of a rear portion of said rear loaded part extends beyond said rear face of said instrument panel.

8. The connection system of claim 7, wherein a portion of each of said pair of parallel guide rails adjacent said proximate end extends obliquely so as to increase the width of said elongated channel.

9. The connection system of claim 7, wherein said pair of tabs are positioned adjacent said distal end of said pair of parallel guide rails.

10. The connection system of claim 7, wherein an end wall extends between said distal ends of said pair of parallel guide rails.

* * * * *